US009600477B2

(12) United States Patent
Ashok et al.

(10) Patent No.: US 9,600,477 B2
(45) Date of Patent: Mar. 21, 2017

(54) ACQUIRING INFORMATION DYNAMICALLY REGARDING A HARDWARE COMPONENT IN THE CLOUD COMPUTING SYSTEM WHILE ON THE FLOOR OF THE DATA CENTER

(71) Applicant: International Business Machines Corporation, Armonk, NY (US)

(72) Inventors: Rohith K. Ashok, Apex, NC (US); Wei L. Chan, Cary, NC (US); Hugh E. Hockett, Raleigh, NC (US); Shu C. Wan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/858,723

(22) Filed: Apr. 8, 2013

(65) Prior Publication Data
US 2013/0221096 A1    Aug. 29, 2013

Related U.S. Application Data

(63) Continuation of application No. 13/356,297, filed on Jan. 23, 2012.

(51) Int. Cl.
*G06F 17/30* (2006.01)
*H04L 12/24* (2006.01)

(52) U.S. Cl.
CPC ............ *G06F 17/30* (2013.01); *H04L 41/082* (2013.01); *H04L 41/04* (2013.01)

(58) Field of Classification Search
CPC .............................. G06F 17/30; H04L 41/082
(Continued)

(56) References Cited

U.S. PATENT DOCUMENTS 5,434,775 A    7/1995 Sims et al.
5,726,435 A    3/1998 Hara et al.
(Continued)

FOREIGN PATENT DOCUMENTS

| CN | 101859366 A | 10/2010 |
| JP | 2004-021362 | 1/2004 |
| WO | 2007054447 A1 | 5/2007 |

OTHER PUBLICATIONS

Office Action for U.S. Appl. No. 13/356,297 dated Mar. 22, 2013.
(Continued)

*Primary Examiner* — Toan Ly
(74) *Attorney, Agent, or Firm* — Robert A. Voigt, Jr.; Winstead, P.C.

(57) ABSTRACT

A method, system and computer program product for managing hardware components in a cloud computing environment. A mobile device captures an image of a bar code placed on a rack that is associated with an identifier that references an Internet resource of the management software that manages the rack. The mobile device transmits a request to the management software for information regarding a component in the rack, where the request includes a unique identifier (e.g., serial number) associated with the component. The management software uses the unique identifier to identify the component of interest and transmits information regarding the component of interest to the mobile device. In this manner, the client device can conveniently access the management software as well as conveniently acquire information dynamically from the management software about specific hardware components in these racks while the user is on the floor of the data center.

11 Claims, 5 Drawing Sheets

(58) Field of Classification Search
USPC .................................................. 235/376, 385
See application file for complete search history.

(56) References Cited

U.S. PATENT DOCUMENTS

| | | |
|---|---|---|
| 6,697,963 B1 | 2/2004 | Nouri et al. |
| 7,203,303 B1 | 4/2007 | Beasley et al. |
| 2002/0084994 A1 | 7/2002 | Hansen |
| 2002/0095487 A1 | 7/2002 | Day et al. |
| 2003/0046339 A1 | 3/2003 | Ip |
| 2006/0136504 A1 | 6/2006 | Babutzka et al. |
| 2009/0273334 A1 | 11/2009 | Holovacs et al. |
| 2009/0310866 A1 | 12/2009 | Hamasaki et al. |
| 2011/0096148 A1 | 4/2011 | Stratmann |
| 2011/0218730 A1 | 9/2011 | Rider et al. |
| 2011/0314466 A1 | 12/2011 | Berg et al. |
| 2011/0320606 A1 | 12/2011 | Madduri et al. |

OTHER PUBLICATIONS

Mell et al., "The NIST Definition of Cloud Computing," Special Publication 800-145, Sep. 2011.
"QR What is a Quick Response Barcode & How to Create or Read One," http://www.prepressure.com/library/technology/qr-code, Nov. 29, 2011.
Office Action for U.S. Appl. No. 13/356,297 dated Aug. 14, 2013.

ACQUIRING INFORMATION DYNAMICALLY REGARDING A HARDWARE COMPONENT IN THE CLOUD COMPUTING SYSTEM WHILE ON THE FLOOR OF THE DATA CENTER

CROSS-REFERENCE TO RELATED APPLICATIONS

The present application is a continuation application of pending U.S. patent application Ser. No. 13/356,297, which was filed on Jan. 23, 2012, which is assigned to the assignee of the present invention. The present application claims priority benefits to U.S. patent application Ser. No. 13/356, 297.

TECHNICAL FIELD

The present invention relates to cloud computing, and more particularly to acquiring information (e.g., utilization, temperature, errors, traffic, current users, health status, name, description) dynamically regarding a hardware component (e.g., server in a rack of computing hardware) in the cloud computing system while on the floor of the data center.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In the cloud computing environment, the computing hardware (e.g., servers) may be stored in "racks" within a data center, which are managed by the management software. The management software can be used to manage all the hardware components, monitor system utilization, intelligently deploy images of data and optimize the operations of the cloud computing environment. A user can access the management software through a web user interface via a web browser by typing in the Uniform Resource Locator (URL) associated with the management software in the web browser. The web user interface can be used by the user to manage the hardware components of the cloud computing environment.

Currently, a user on the floor of the data center does not have a convenient way for accessing the management software, without specifically typing the URL associated with the management software in a web browser of a device being carried by the user. If the user could access the management software while being on the floor of the data center without the step of typing the URL associated with the management software in a web browser of a device being carried by the user, then time could be saved.

Furthermore, there is not currently a convenient way for the user to acquire information dynamically from the management software about specific hardware components in these racks while on the floor of the data center.

BRIEF SUMMARY

In one embodiment of the present invention, a method for managing hardware components in a cloud computing environment comprises capturing an image of a bar code placed on a rack containing computer hardware of the cloud computing environment, where the image of the bar code is associated with an identifier that references an information resource of a management software configured to manage the computer hardware. The method further comprises accessing the information resource of the management software using the identifier. Additionally, the method comprises downloading images of components of the rack from the management software, where the images of the components of the rack comprise unique identifiers. Furthermore, the method comprises capturing an image of a component in the rack a user is currently viewing. The method additionally comprises identifying the component by matching the image of the component with one of the downloaded images of the components of the rack. In addition, the method comprises transmitting a request for information regarding the identified component to the management software, where the request comprises a unique identifier associated with the identified component. Furthermore, the method comprises receiving information regarding the identified component. The method further comprises displaying, by a processor, the received information regarding the identified component that overlays a displayed image of the component.

Other forms of the embodiment of the method described above are in a system and in a computer program product.

In another embodiment of the present invention, a method for managing hardware components in a cloud computing environment comprises interrogating an electronic tag placed on a rack containing computer hardware of the cloud computing environment, where the electronic tag transmits identification information comprising an identifier that references an information resource of a management software configured to manage the computer hardware. The method further comprises accessing the information resource of the management software using the identifier. Additionally, the method comprises downloading images of components of the rack from the management software, where the images of the components of the rack comprise unique identifiers. Furthermore, the method comprises capturing an image of a component in the rack a user is currently viewing. The method additionally comprises identifying the component by matching the image of the component with one of the downloaded images of the components of the rack. In addition, the method comprises transmitting a request for information regarding the identified component to the management software, where the request comprises a unique identifier associated with the identified component. Furthermore, the method comprises receiving information regarding the identified component. The method further comprises displaying, by a processor, the received information regarding the identified component that overlays a displayed image of the component.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for managing hardware components in a cloud computing environment. In one embodiment of the present invention, a mobile device captures an image of a bar code (e.g., quick response (QR) code) placed on a rack that is associated with an identifier (e.g., Uniform Resource Locator) that references an Internet resource of the management software that manages the rack. The mobile device accesses the Internet resource of the management software using the identifier. The mobile device downloads images (e.g., pictures) of the components in the rack from the management software, where the images include unique identifiers (e.g., serial numbers). The mobile device further captures an image of a component (e.g., server) in the rack the user is currently viewing, which is used by the image matching software to identify the particular component of interest by matching the image of the component with one of the previously downloaded images of the components in the rack. The mobile device transmits a request for information regarding the component of interest to the management software, where the request includes the unique identifier (e.g., serial number) associated with the component of interest. The management software uses the received unique identifier to identify the component of interest and transmits to the mobile device information regarding the identified component of interest (e.g., metrics, utilization, temperature, energy, errors, traffic, current users, health status, name, description) where the information is displayed by overlaying it with a displayed image of the component. Various actions may be performed on the component. In such a case, the mobile device informs the management software regarding an action to be performed on the component. In response, the mobile device receives guided instructions to perform the requested action from the management software. In this manner, the client device can conveniently access the management software while the user is on the floor of the data center as well as conveniently acquire information dynamically from the management software about specific hardware components in these racks while on the floor of the data center.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Figure 1:
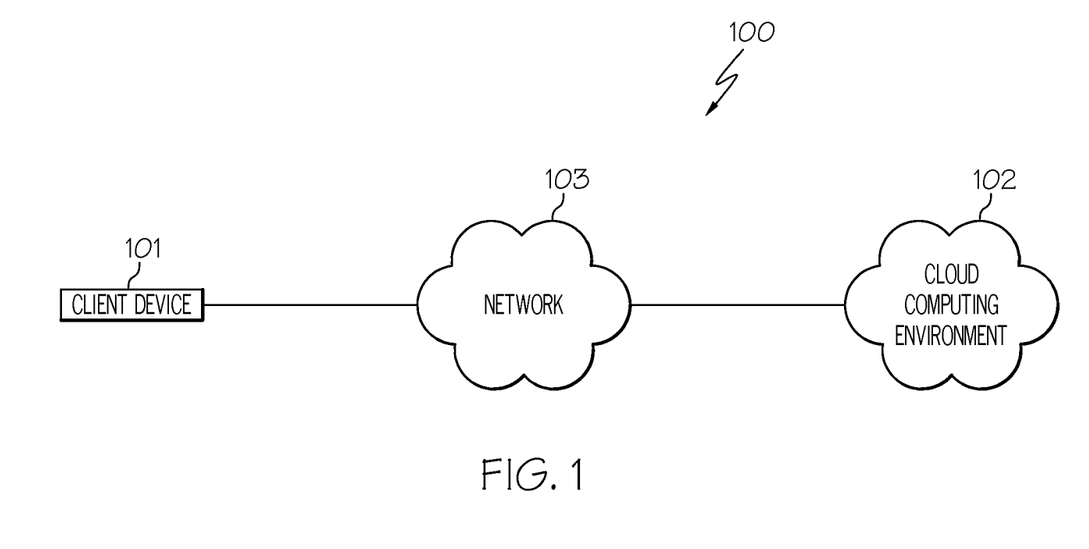
FIG. 1 illustrates a network system configured in accordance with an embodiment of the present invention.

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of mobile computing device (e.g., portable computing unit, personal digital assistant (PDA), smartphone, laptop computer, mobile phone, tablet and the like) that could be used by a user on the floor of a data center of a cloud computing environment configured with the capability of connecting to cloud computing environment 102 via network 103. A description of the hardware configuration of client device 101 is provided further below in connection with FIG. 4.

Network 103 may be, for example, a wireless wide area network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
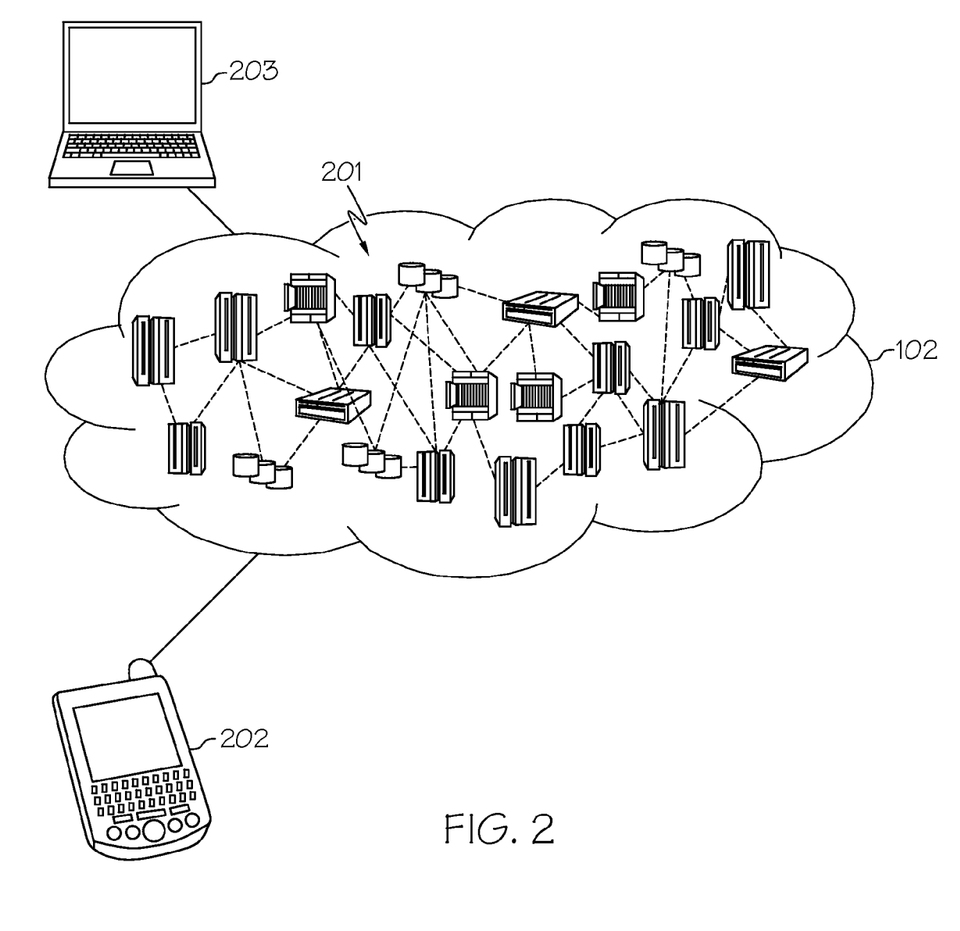
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 with which local computing devices used by cloud consumers, such as, for example, personal digital assistant (PDA) or cellular telephone 202 and/or laptop computer 203 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. Cloud computing nodes may include one or more racks of computing hardware (e.g., servers) that are managed by a server (referred to herein as the "administrative server") in the cloud computing environment 102 as discussed below in greater detail in connection with FIG. 3.

It is understood that the types of mobile computing devices 202, 203 shown in FIG. 2, which may represent client device 101 of FIG. 1, are intended to be illustrative and that cloud computing nodes 201 and cloud computing environment 102 can communicate with any type of mobile computerized device over any type of network and/or network addressable connection (e.g., using a web browser). Program code located on one of nodes 201 may be stored on a computer recordable storage medium in one of nodes 201 and downloaded to computing devices 202, 203 over a network for use in these computing devices. For example, a server computer in computing nodes 201 may store program code on a computer readable storage medium on the server computer. The server computer may download the program code to computing device 202, 203 for use on the computing device.

Figure 3:
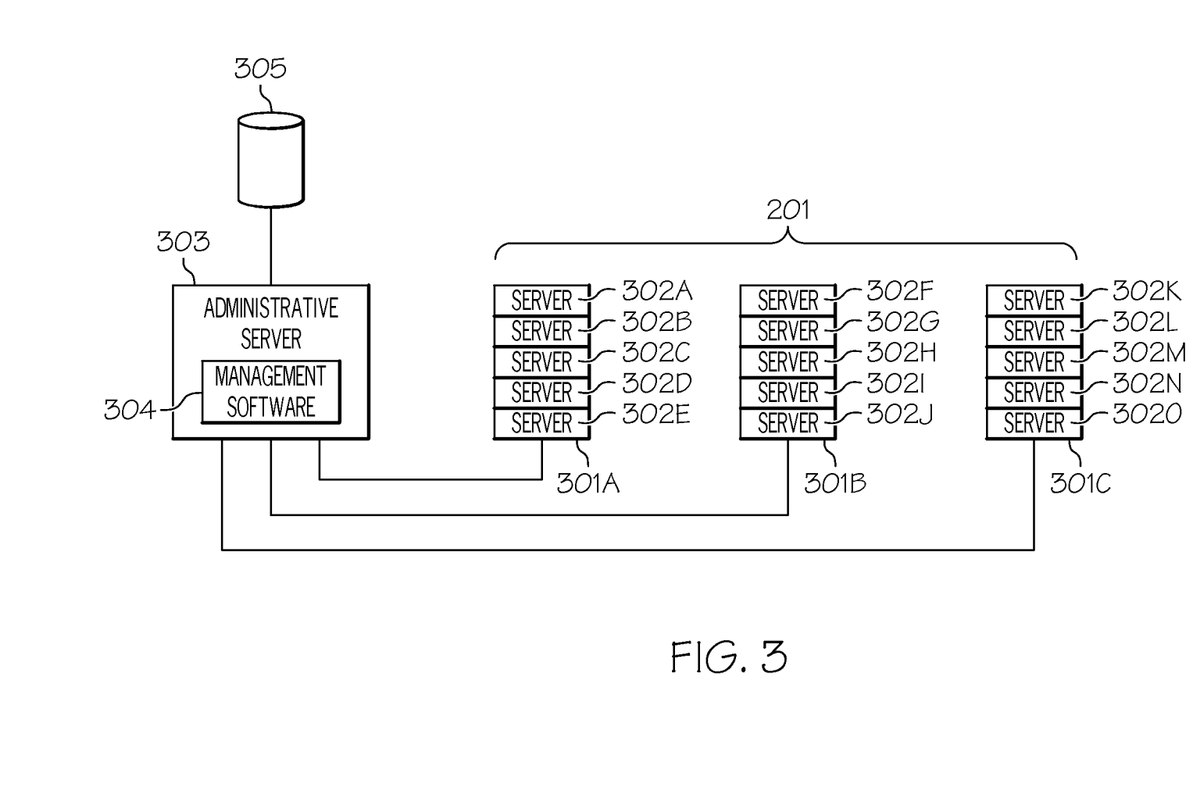
FIG. 3 illustrates a schematic of racks of computing hardware of the cloud computing node(s) that are managed by an administrative server in accordance with an embodiment of the present invention.

Referring now to FIG. 3, FIG. 3 illustrates a schematic of racks of computing hardware (e.g., servers) of cloud computing node(s) 201 that are managed by an administrative server in accordance with an embodiment of the present invention.

As shown, cloud computing node(s) 201 (also may be referred to as a "cluster") may include one or more racks 301A-301C of hardware components, such as servers or other electronic devices. These hardware components may be referred to as "compute nodes." For example, rack 301A houses servers 302A-302E, rack 301B houses servers 302F-302J and rack 301C houses servers 302K-302O. Racks 301A-301C may collectively be referred to as racks 301 or rack 301, respectively. Furthermore, servers 302A-302O (or "compute nodes") may collectively be referred to as servers 302 or server 302, respectively. FIG. 3 is not to be limited in scope to the number of racks 301 or servers 302 depicted. For example, cloud computing node 201 may be comprised of any number of racks 301 which may house any number of servers 302. Furthermore, while FIG. 3 illustrates racks 301 housing servers 302, racks 301 may house any type of computing component that is used by cloud computing node 201. Furthermore, while the following discusses hardware components being confined in designated racks 301, it is noted for clarity that the hardware components may be distributed across cloud computing environment 102 (FIGS. 1 and 2).

As further shown in FIG. 3, racks 301 are each coupled to an administrative server 303 configured to provide data center-level functions. Administrative server 303 supports a module, referred to herein as the management software 304, that can be used to manage all the hardware components 302, monitor system utilization, intelligently deploy images of data and optimize the operations of cloud computing environment 102.

Additionally, FIG. 3 depicts a database 305 configured to store information regarding components 302, such as metrics, utilization, temperature, energy, errors, traffic, current users, health status, name, description, etc. Such information may be used by the user of client device 101 (FIG. 1) in determining if an action needs to be performed on the component as discussed further below in connection with FIG. 5. Furthermore, database 305 may store images of components 302 that are associated with location information (e.g., location of component 302 on the floor of the data center) as discussed further below in connection with FIG. 5.

Figure 4:
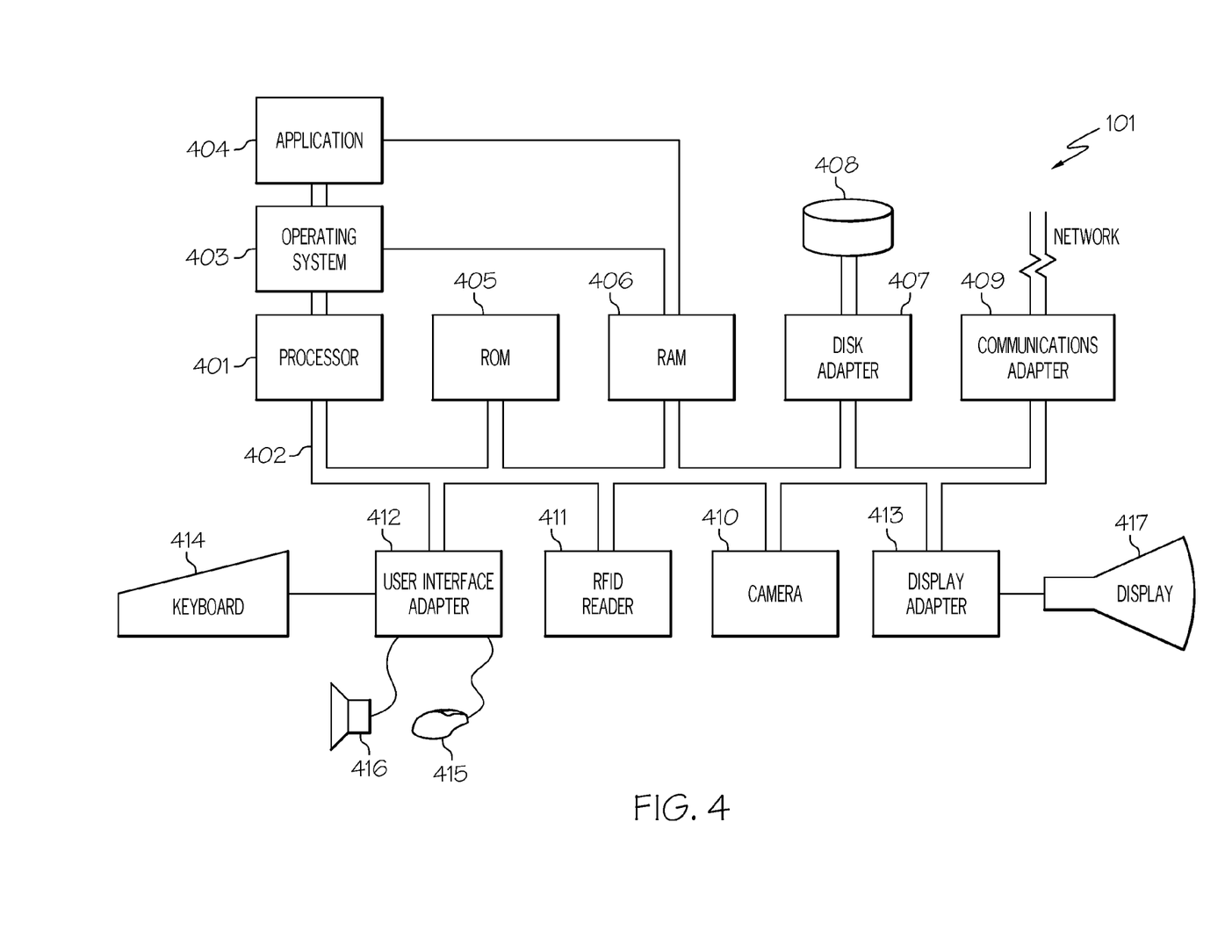
FIG. 4 illustrates a hardware configuration of a client device configured in accordance with an embodiment of the present invention.

Referring now to FIG. 4, FIG. 4 illustrates a hardware configuration of client device 101 (FIG. 1) which is representative of a hardware environment for practicing the present invention. Referring to FIG. 4, client device 101 has a processor 401 coupled to various other components by system bus 402. An operating system 403 runs on processor 401 and provides control and coordinates the functions of the various components of FIG. 4. An application 404 in accordance with the principles of the present invention runs in conjunction with operating system 403 and provides calls to operating system 403 where the calls implement the various functions or services to be performed by application 404. Application 404 may include, for example, a browser, an image matching program as discussed further below in association with FIG. 3, and a program for managing hardware components (e.g., components 302 of FIG. 3) in cloud computing environment 102 (FIGS. 1 and 2) as discussed further below in association with FIG. 5.

Referring again to FIG. 4, read-only memory ("ROM") 405 is coupled to system bus 402 and includes a basic input/output system ("BIOS") that controls certain basic functions of client device 101. Random access memory ("RAM") 406 and disk adapter 407 are also coupled to system bus 402. It should be noted that software components including operating system 403 and application 404 may be loaded into RAM 406, which may be client device's 101 main memory for execution. Disk adapter 407 may be an integrated drive electronics ("IDE") adapter that communicates with a disk unit 408, e.g., disk drive. It is noted that the program for managing hardware components (e.g., components 302) in cloud computing environment 102, as discussed further below in connection with FIG. 5, may reside in disk unit 408 or in application 404. It is further noted that the image matching program, as discussed further below in connection with FIG. 5, may reside in disk unit 408 or in application 404.

Client device 101 may further include a communications adapter 409 coupled to bus 402. Communications adapter 409 interconnects bus 402 with an outside network (network 103 of FIG. 1) thereby enabling client device 101 to communicate with cloud computing environment 102.

Client device 101 may further include a camera 410 configured to capture images on rack 301 (FIG. 3), such as images of a bar code (e.g., quick response code), that is associated with an identifier, such as a Uniform Resource Locator (URL), that references an Internet resource of management software 304 (FIG. 3) for rack 301. For example, the bar code may represent a URL which is used by client device 101 to access the web page user interface of management software 304. Additionally, camera 410 is configured to capture images of component 302 (FIG. 3) of rack 301 or a portion of component 302 of rack 301 (e.g., serial number) which is transmitted to management software 304 and used by management software 304 to acquire information (e.g., metrics, utilization, temperature, energy, errors, traffic, current users, health status, name and description) about component 302 from database 305 (FIG. 3). A more detailed description of the use of camera 410 in connection with managing hardware components 302 from the floor of a data center in a convenient manner is discussed further below in connection with FIG. 5.

Client device 101 may additionally include a Radio-Frequency Identification ("RFID") reader 411 configured to transmit an encoded radio signal to interrogate an electronic tag, called an RFID tag. In one embodiment, the RFID tag is attached to rack 301. When the RFID tag receives the message from RFID reader 411, it responds by providing identification information. In one embodiment, the identification information includes an identifier, such as a Uniform Resource Locator (URL), that references an Internet resource of management software 304 (FIG. 3) for rack 301.

I/O devices may also be connected to client device 101 via a user interface adapter 412 and a display adapter 413. Keyboard 414, mouse 415 and speaker 416 may all be interconnected to bus 402 through user interface adapter 412. A display monitor 417 may be connected to system bus 402 by display adapter 413. In this manner, a user is capable of inputting to client device 101 through keyboard 414 or mouse 415 and receiving output from client device 101 via display 417 or speaker 416.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, a user on the floor of the data center does not have a convenient way for accessing the management software, without specifically typing the URL associated with the management software in a web browser of a device being carried by the user. If the user could access the management software while being on the floor of the data center without the step of typing the URL associated with the management software in a web browser of a device being carried by the user, then time could be saved. Furthermore, there is not currently a convenient way for the user to acquire information dynamically from the management software about specific hardware components in these racks while on the floor of the data center.

Figure 5:
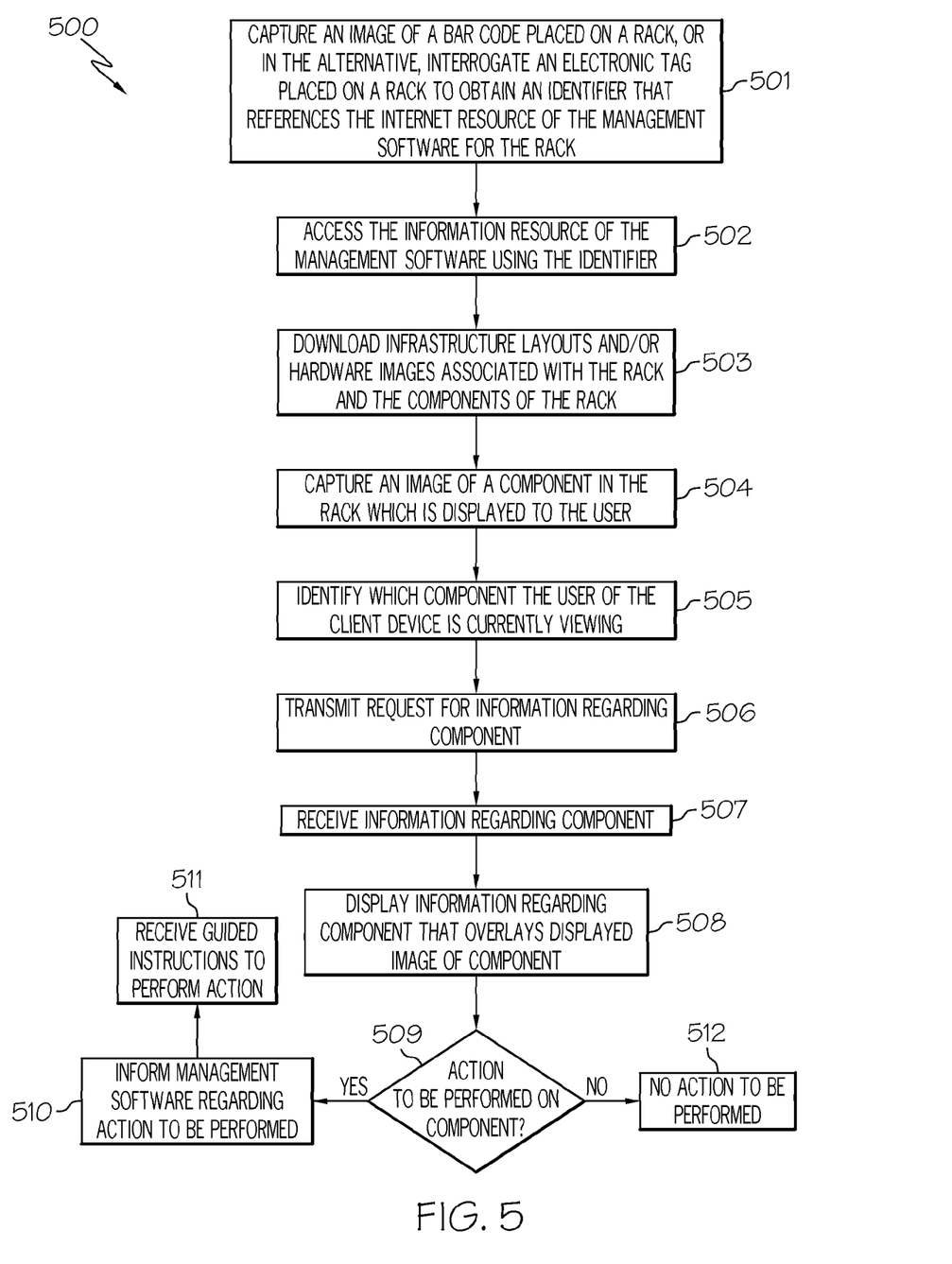
FIG. 5 is a flowchart of a method for providing a convenient way for the user on the floor of the data center to manage the hardware components in the cloud computing environment in accordance with an embodiment of the present invention.

The principles of the present invention provide a convenient way to access the management software while on the floor of the data center as well as convenient way to acquire information dynamically from the management software about specific hardware components which may be used by the user to decide to perform particular actions (e.g., terminating operation of the component) as discussed below in connection with FIG. 5. FIG. 5 is a flowchart of a method 500 for providing a convenient way for the user on the floor of the data center to manage hardware components 302 (FIG. 3) in cloud computing environment 102 (FIGS. 1 and 2) in accordance with an embodiment of the present invention.

Referring to FIG. 5, in conjunction with FIGS. 1-4, in step 501, client device 101 captures an image of a bar code (e.g., quick response (QR) code) placed on rack 301 that is associated with an identifier (e.g., URL) that references an Internet resource of management software 304 for rack 301. In the alternative, client device 101 interrogates an electronic tag, an RFID tag, placed on rack 301 that provides identification information to client device 101, where the identification information includes an identifier (e.g., URL) that references an Internet resource of management software 304 for rack 301.

In one embodiment, each rack 301, and its components 302, may be managed by management software 304. An image, such as a QR bar code, is placed on rack 301 which may contain embedded information that corresponds to an identifier, such as the URL, for the Internet resource of management software 304. In the alternative, an electronic tag, such as an RFID tag, is placed on rack 301 which may transmit identification information to RFID reader 411 (after being interrogated by RFID reader 411) that includes an identifier, such as the URL, for the Internet resource of management software 304. In this manner, client device 101 can conveniently access management software 304 while the user is on the floor of the data center without the step of manually typing the URL associated with the management software in a web browser of a device being carried by the user. In another embodiment, the bar code may further contain location information as to the particular location of rack 301 in the data center. Similarly, in another embodiment, the identification information transmitted by the electronic tag may also include location information as to the particular location of rack 301 in the data center.

In step 502, client device 101 accesses the information resource of management software 304 using the acquired identifier (e.g., URL). That is, client device 101 accesses the web page user interface of management software 304 using the acquired identifier.

In step 503, client device 101 downloads infrastructure layouts and/or hardware images (e.g., pictures) associated with rack 301 (rack 301 associated with the bar code or RFID tag that provided the identifier) and components 302 of rack 301 from management software 304. In one embodiment, the infrastructure layouts and/or hardware images include unique identifiers, such as serial numbers, associated with components 302 of rack 301.

In step 504, client device 101 captures an image of component 302 in rack 301 the user is currently viewing, which is displayed to the user via display 417.

In step 505, client device 101 identifies which component 302 the user is currently viewing by using image matching software whereby the image of component 302 the user is currently viewing is matched with one of the images previously downloaded by client device 101 in step 503. Once a match is found, client device 101 obtains the unique identifier (e.g., serial number) associated with the identified component 302 from the matched image previously downloaded by client device 101. In one embodiment, client device 101 instead transmits an image of component 302 to management software 304 which may be used by management software 304 to match one of the stored pictures of components 302 in database 305. The matched picture corresponds to the particular component 302 the user is currently viewing. In another embodiment, client device 101 instead transmits a portion of component 302 (e.g., serial number) to management software 304 which is used by management software 304 to identify the particular component 302 the user is currently viewing. For example, database 305 may store a table of serial numbers associated with components 302.

In step 506, client device 101 transmits a request to management software 304 for information regarding component 302 that the user is currently viewing. Such a request may include an identifier, such as a serial number, that is used to identify component 302 of interest to the user.

In step 507, client device 101 receives from management software 304 information regarding the operability of component 302. For example, management software 304, upon receiving an identifier that identifies component 302 of interest to the user, management software 304 acquires information regarding the operability of component 302 from database 305, such as metrics, utilization, temperature, energy, errors, traffic, current users, health status, name, description and so forth. Such information is transmitted to client device 101 by management software 304. In this manner, the user is provided a convenient way to acquire information dynamically from management software 304 about specific hardware components 302 in these racks 301 while on the floor of the data center.

In step 508, client device 101 displays the received information regarding component 302 by overlaying such information over a displayed image of component 302. In one embodiment, after the user of client device 101 captures an image of component 302, various information can be overlaid onto the picture (generated or real) of component 302. In another embodiment, information can further include stats as well as performable actions. In another embodiment, the user can manually zoom in and out on component 302 (including portions of component 302) and view stats at different layers. In one embodiment, as the user manually zooms in on component 302, the user can view the internal operations of component 302, including both real or virtual operations (e.g., visual representation of virtual machines running on cloud computing node 201). In one embodiment, the user can monitor rack 301, selecting various stats to be overlaid (e.g., gradient for temperature, bar graphs for performance) on the depicted image of component 302/rack 301. In one embodiment, the user is provided an option of selecting which particular information (e.g., which particular stats) are to be overlaid on the depicted image of component 302 so as to not include so much information as to obscure the image of component 302. In one embodiment, the overlays are rendered to match component 302 being displayed so that when the user gets closer or further away to component 302, the overlays get larger as the image of component 302 being displayed gets larger and vice-versa.

In step 509, the user of client device 101 determines whether an action (e.g., evacuating, terminating operation of component 302 for maintenance) is to be performed on component 302 based on the information received in step 507. In one embodiment, the information received in step 507 can include performable actions on component 302, where the user may determine whether one of these actions should be performed on component 302.

If the user determines an action is to be performed on component 302, then, in step 510, client device 101 informs management software 304 regarding an action (e.g., terminating operation of component 302 for maintenance) to be performed on component 302. For example, the user of client device 101 may select one of the actions provided by management software 304 to be performed on component 302.

In step 511, client device 101 receives guided instructions from management software 304 to perform the requested action on component 302.

If, however, the user determines to not perform an action on component 302, then, in step 512, no action is to be performed.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for managing hardware components in a cloud computing environment, the method comprising:
   capturing an image of a bar code placed on a rack containing a plurality of computer hardware components of said cloud computing environment, wherein said image of said bar code is associated with an identifier that references an information resource of a management software configured to manage said computer hardware on said rack;
   accessing said information resource of said management software using said identifier;
   downloading photographs of said plurality of computer hardware components of said rack from said management software;
   capturing a photograph of a computer hardware component in said rack;
   matching said photograph of said computer hardware component with one of said downloaded photographs of said plurality of computer hardware components of said rack to identify a matching downloaded photograph;

identifying a component serial number for the matching downloaded photograph from a table of serial numbers respectively corresponding to said downloaded photographs of said plurality of computer hardware components;

transmitting a request for information regarding said component serial number to said management software, wherein said requested information comprises current users of said computer hardware component, unresolved error codes of said computer hardware component, and utilization data of said computer hardware component;

receiving information as requested for said computer hardware component; and displaying, by a processor, said received information for said computer hardware component and said component serial number that overlays a displayed downloaded photograph of said computer hardware component.

2. The method as recited in claim 1, wherein said bar code comprises a Quick Response code.

3. The method as recited in claim 1, wherein said information regarding said computer hardware component comprises one or more of the following: utilization, temperature, energy, errors, traffic, current users, health status, name and description.

4. The method as recited in claim 1 further comprising:
informing said management software regarding an action to be performed on said computer hardware component based on said information regarding said computer hardware component.

5. The method as recited in claim 4, wherein said information regarding said computer hardware component comprises performable actions on said computer hardware component.

6. The method as recited in claim 4 further comprising:
receiving guided instructions to perform said action.

7. A method for managing hardware components in a cloud computing environment, the method comprising:
interrogating an electronic tag placed on a rack containing a plurality of computer hardware components of said cloud computing environment, wherein said electronic tag transmits identification information comprising an identifier that references an information resource of a management software configured to manage said computer hardware on said rack;

accessing said information resource of said management software using said identifier;

downloading photographs of said plurality of computer hardware components of said rack from said management software;

capturing a photograph of a computer hardware component in said rack;

matching said photograph of said computer hardware component with one of said downloaded photographs of said plurality of computer hardware components of said rack to identify a matching downloaded photograph;

identifying a component serial number for the matching downloaded photograph from a table of serial numbers respectively corresponding to said downloaded photographs of said plurality of computer hardware components;

transmitting a request for information regarding said component serial number to said management software, wherein said requested information comprises current users of said computer hardware component, unresolved error codes of said computer hardware component, and utilization data of said computer hardware component;

receiving information as requested for said computer hardware component; and displaying, by a processor, said received information for said computer hardware component and said component serial number that overlays a displayed downloaded photograph of said computer hardware component.

8. The method as recited in claim 7, wherein said information regarding said computer hardware component comprises one or more of the following: utilization, temperature, energy, errors, traffic, current users, health status, name and description.

9. The method as recited in claim 7 further comprising:
informing said management software regarding an action to be performed on said computer hardware component based on said information regarding said computer hardware component.

10. The method as recited in claim 9, wherein said information regarding said computer hardware component comprises performable actions on said computer hardware component.

11. The method as recited in claim 9 further comprising:
receiving guided instructions to perform said action.

* * * * *